US009313648B2

(12) United States Patent
Malhotra et al.

(10) Patent No.: US 9,313,648 B2
(45) Date of Patent: Apr. 12, 2016

(54) NETWORK SELECTION SUPPORT FOR WIRELESS COMMUNICATION DEVICES

(71) Applicant: Sprint Communications Company L.P., Overland Park, KS (US)

(72) Inventors: Rajil Malhotra, Olathe, KS (US); Ashish Bhan, Shawnee, KS (US); Rajesh Kumar Nautiyal, Olathe, KS (US); Asfaw Negeri, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 305 days.

(21) Appl. No.: 14/021,070

(22) Filed: Sep. 9, 2013

(65) Prior Publication Data

US 2015/0071166 A1      Mar. 12, 2015

(51) Int. Cl.
*H04W 8/22* (2009.01)
*H04W 48/18* (2009.01)
*H04W 92/14* (2009.01)

(52) U.S. Cl.
CPC ............... *H04W 8/22* (2013.01); *H04W 48/18* (2013.01); *H04W 92/14* (2013.01)

(58) Field of Classification Search
None
See application file for complete search history.

(56) References Cited

U.S. PATENT DOCUMENTS

| 8,285,291 | B2 | 10/2012 | Dinan et al. |
| 8,842,541 | B2 * | 9/2014 | Shaikh ................ H04L 41/0893 370/236 |
| 8,874,710 | B2 * | 10/2014 | Reunamaki ............. H04L 67/16 709/200 |
| 9,060,372 | B2 * | 6/2015 | Sachs ..................... H04W 48/18 |
| 9,100,853 | B2 * | 8/2015 | Garcia Martin .... H04L 12/5692 |
| 2009/0305684 | A1 | 12/2009 | Jones et al. |
| 2010/0296415 | A1 * | 11/2010 | Sachs .................... H04W 48/18 370/254 |
| 2011/0044253 | A1 | 2/2011 | Zisimopoulos |
| 2011/0067085 | A1 | 3/2011 | Brouard et al. |
| 2011/0110300 | A1 | 5/2011 | Sachs et al. |
| 2011/0188376 | A1 * | 8/2011 | Stupar ................. H04L 12/5692 370/235 |
| 2011/0225306 | A1 | 9/2011 | Delsesto et al. |

(Continued)

FOREIGN PATENT DOCUMENTS

EP      2449822      1/2011
WO      2009127238 A1      10/2009

(Continued)

OTHER PUBLICATIONS

Dolan, "LTE-CDMA Interworking eHRPD—Use of a Common Core and Stepping Stone to LTE", Alcatel Lucent, published 2009, pp. 1-13, (http://cms.comsoc.org/SiteGen/Uploads/Public/Docs_Globecom_2009/5-Globecomm_2009_-_LTE-CDMA_IWK_-_M.Dolan.pdf).*

(Continued)

*Primary Examiner* — Timothy J Weidner (57) ABSTRACT

In an LTE network, an MME processes network status information to transfer aggregated data to an ANDSF. The ANDSF processes a request from a wireless communication device that indicates device location and the aggregated data to generate an information response indicating a priority between the LTE network and a non-LTE network at the device location. The ANDSF transfers the information response for delivery to the wireless communication device. The wireless communication device processes the information response to select between the LTE network and a non-LTE network at the device location.

16 Claims, 8 Drawing Sheets

(56) References Cited

U.S. PATENT DOCUMENTS

| | | | |
|---|---|---|---|
| 2012/0071165 A1* | 3/2012 | Pampu | H04W 8/08 455/437 |
| 2012/0196644 A1* | 8/2012 | Scherzer | H04W 72/02 455/524 |
| 2012/0257598 A1 | 10/2012 | Karampatsis et al. | |
| 2013/0041981 A1* | 2/2013 | Kim | H04W 48/16 709/217 |
| 2013/0142042 A1* | 6/2013 | Garcia Martin | H04L 12/5692 370/230 |
| 2013/0163463 A1 | 6/2013 | Grayson et al. | |
| 2013/0165131 A1* | 6/2013 | Garcia Martin | H04L 41/12 455/450 |
| 2013/0310030 A1* | 11/2013 | Ventimiglia | H04W 48/16 455/434 |
| 2014/0029420 A1* | 1/2014 | Jeong | H04W 28/08 370/229 |

FOREIGN PATENT DOCUMENTS

| | | |
|---|---|---|
| WO | 2009127276 A1 | 10/2009 |
| WO | 2011002370 | 1/2011 |

OTHER PUBLICATIONS

"3rd Generation Partnership Project; Technical Specification Group Services and System Aspects; Architecture enhancements for non-3GPP accesses (Release 8);" 3GPP TS 23.402; Sep. 2008; pp. 1-190; V8.3.0; 3rd Generation Partnership Project; Valbonne, France.

Huawei; "Handover procedure with Access Network Discovery and Selection;" 3GPP TSG-SA2; Apr. 7, 2008; pp. 1-5; Meeting #64; Jeju Island, Korea.

Research in Motion; "Access and Service Provider selection;" SA WG2; Apr. 8, 2013; pp. 1-16; Meeting #S2-96; 3rd Generation Partnership Project; San Diego, California, USA.

\* cited by examiner

NETWORK SELECTION SUPPORT FOR WIRELESS COMMUNICATION DEVICES

TECHNICAL BACKGROUND

Wireless communication devices may use multiple networks, such as Long Term Evolution (LTE), Code Division Multiple Access (CDMA), Global System for Mobile communications (GSM), Evolution Data Optimized (EVDO), High Speed Packet Access (HSPA), enhanced High Rate Packet Data (eHRPD), evolved High Speed Packet Access (eHSPA), Wireless Fidelity (WiFi), and the like. On LTE networks, the wireless communication devices receive support with network selection from an Access Network Discovery and Selection Function (ANDSF).

ANDSFs are available to user devices after attachment to the LTE network. The ANDSF may provide some data for help in network selection, but unfortunately, the ANDSF has not been effectively and efficiently integrated with other network systems. For example, communications between Mobility Management Entities (MMEs) and ANDSFs are not optimized to support robust network selection by the wireless communication devices.

Media sessions, such as video streaming and voice calling, are supported by various networks. Wireless communication devices often select one of these networks for media services based on simple measurements such as radio signal strength and noise levels. Network selection by the wireless communication devices for specific applications, such as voice, video, and email, is inhibited by current ANDSFs and associated systems.

TECHNICAL OVERVIEW

In an LTE network, an MME processes network status information to transfer aggregated data to an ANDSF. The ANDSF processes a request from a wireless communication device that indicates device location and the aggregated data to generate an information response indicating a priority between the LTE network and a non-LTE network at the device location. The ANDSF transfers the information response for delivery to the wireless communication device. The wireless communication device processes the information response to select between the LTE network and a non-LTE network at the device location.

DETAILED DESCRIPTION

Figure 1:
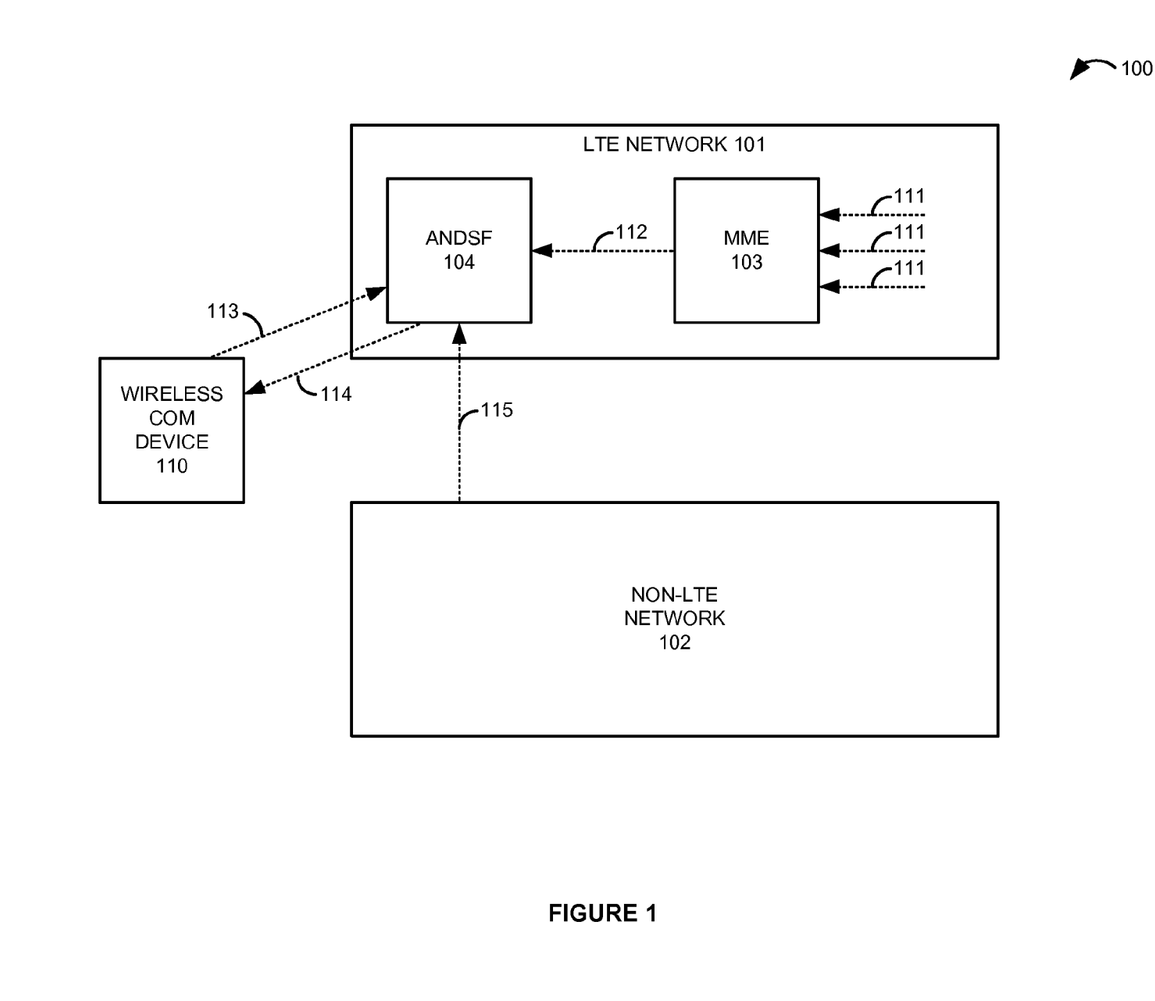
FIG. 1 illustrates a wireless communication network to support network selection by a wireless communication device.

FIG. 1 illustrates wireless communication network 100 to support network selection by wireless communication device 110. Wireless communication network 100 comprises Long Term Evolution (LTE) network 101, non-LTE network 102, and wireless communication device 110. LTE network 101 includes Mobility Management Entity (MME) 103 and Access Network Discovery and Selection Function (ANDSF) 104. Wireless communication network 100 is typically more complex, but has been simplified to illustrate innovative aspects. Some conventional aspects of wireless communication network 100 are omitted for clarity, such as network elements, servers, links, enclosures, power supplies, and the like.

In operation, MME 103 receives LTE network status data 111. LTE network status data 111 may comprise RF status data from eNodeBs, Voice over LTE (VoLTE) service data, video streaming service data, or some other network information. MME 103 processes LTE network status data 111 to transfer aggregated LTE network data 112 to ANDSF 104. ANDSF 104 receives aggregated LTE network data 112. Aggregated LTE network data 112 may indicate RF status, VoLTE service status, video streaming service status, or some other network status metrics.

Wireless communication device 110 transfers information request 113 indicating device location to ANDSF 104. The device location may take various forms including geographic coordinates, physical address, zip/area code, network sector ID, radio signal information, and the like. ANDSF 104 receives information request 113. Information request 113 may include additional information such as: user identifiers, user queries/instructions, device identifiers, media type identifiers, application identifiers, network identifiers, base station identifiers, sector identifiers, RF measurements, device status, or some other data.

ANDSF 104 processes aggregated LTE network data 112 and information request 113 including the device location to generate information response 114. Information response 114 indicates priorities between LTE network 101 and non-LTE network 102 at the device location. ANDSF 104 transfers the information response to wireless communication device 110. Information response 114 may indicate the priorities with an ordered list of network contact information keyed to various proximate geographic areas. Note that information response 114 typically delivers information for a larger geographic area around the device location, and wireless communication device may obtain different network selection results as the device location varies within the larger geographic area.

Information response 114 may also indicate the priorities with thresholds and associated logic to control network selection based on real-time parameters such as, signal strength, RF noise, network ID, sector ID, communication protocol, user ID, device ID, application ID, and the like. For example, a portion of the logic using dummy values might be: if LTE sector ID=1234 and application ID=voice call, then use network ID 456 at frequency 1.91 channel 3 if signal strength is >60, else use network ID 789 at frequency 2.22 channel 7 if signal strength is <60 and >40, else use network ID . . . . Information response 114 also includes contact information for LTE network 101 and non-LTE network 102. The contact information may indicate network ID, sector ID, frequency/carrier bands, communication protocol, communication channel, media service, modulation and coding schema, Multiple Input Multiple Output (MIMO) configurations, user ID, access code, or some other network attachment data.

Wireless communication device 110 receives and processes information response 114 that indicates the priorities at the device location to select either LTE network 101 or non-LTE network 102. For example, communication device 110 may select non-LTE network 102 for voice calling based on poor VoLTE quality metrics for LTE network 101 at the device location. Wireless communication device 110 then exchanges wireless communications with the selected network.

ANDSF 104 may process RF data from eNodeBs at the device location to determine priority between LTE network 101 and non-LTE network 102 at the device location. ANDSF 104 may process VoLTE service status for the device location to determine priority between LTE network 101 and non-LTE network 102 to provide voice calling at the device location. ANDSF 104 may process video streaming service status for the device location to determine priority between LTE network 101 and non-LTE network 102 to provide video streaming at the device location. ANDSF 104 may process a user identifier to determine the priority between LTE network 101 and non-LTE network 102 based on the user identifier. ANDSF 104 may process a media service identifier to determine the priority between LTE network 101 and non-LTE network 102 based on the media service identifier.

Although not required, ANDSF 104 may also receive network status data 115 from non-LTE network 102. Non-LTE network 102 may comprise Code Division Multiple Access (CDMA) network, Global System for Mobile communications (GSM) network, enhanced High Rate Packet Data (eHRPD) network, evolved High Speed Packet Access (eHSPA) network, Wireless Fidelity (WiFi) network, or some other wireless communication network. Non-LTE network status data 115 may comprise RF status data from base stations, voice calling service data, video streaming service data, or some other network information for non-LTE network 102. Communication system 100 may include an interface server to receive and process network status data 115 from non-LTE 102 for aggregation and delivery to ANDSF 104. In some examples, ANDSF 104 may compare data from both networks 101-102 to perform network selection. Thus, ANDSF 104 may compare RF data, active user numbers, voice calling status, video streaming status on a per-network, per-location, per-user, and per-application basis.

LTE network 101 typically includes additional network elements such as MMEs, ANDSFs, eNodeBs, Serving Gateways (S-GWs), Packet Data Network Gateways (P-GWs), Policy Control and Rules Functions (PCRFs), Home Subscriber Servers (HSSs), Internet Protocol Multimedia Subsystem (IMS) servers, and the like. Various LTE architectures could be used that have additional elements or that omit some of these elements.

Non-LTE network 102 typically includes network elements such as base stations, network control systems, gateways, servers, and the like. Non-LTE network 102 could be utilize various wireless protocols, such as CDMA, GSM, EVDO, eHRPD, HSPA, eHSPA, Wireless Fidelity (WiFi), or some other non-LTE protocol.

Wireless communication device 110 might be a phone, computer, media player, machine appliance, wireless transceiver, and/or some other apparatus with wireless networking components. Wireless communication device 110 comprises circuitry, memory, software, and communication transceivers. Wireless communication device 110 may be integrated within other systems and devices, such as vehicles, appliances, apparel, and the like.

Figure 2:
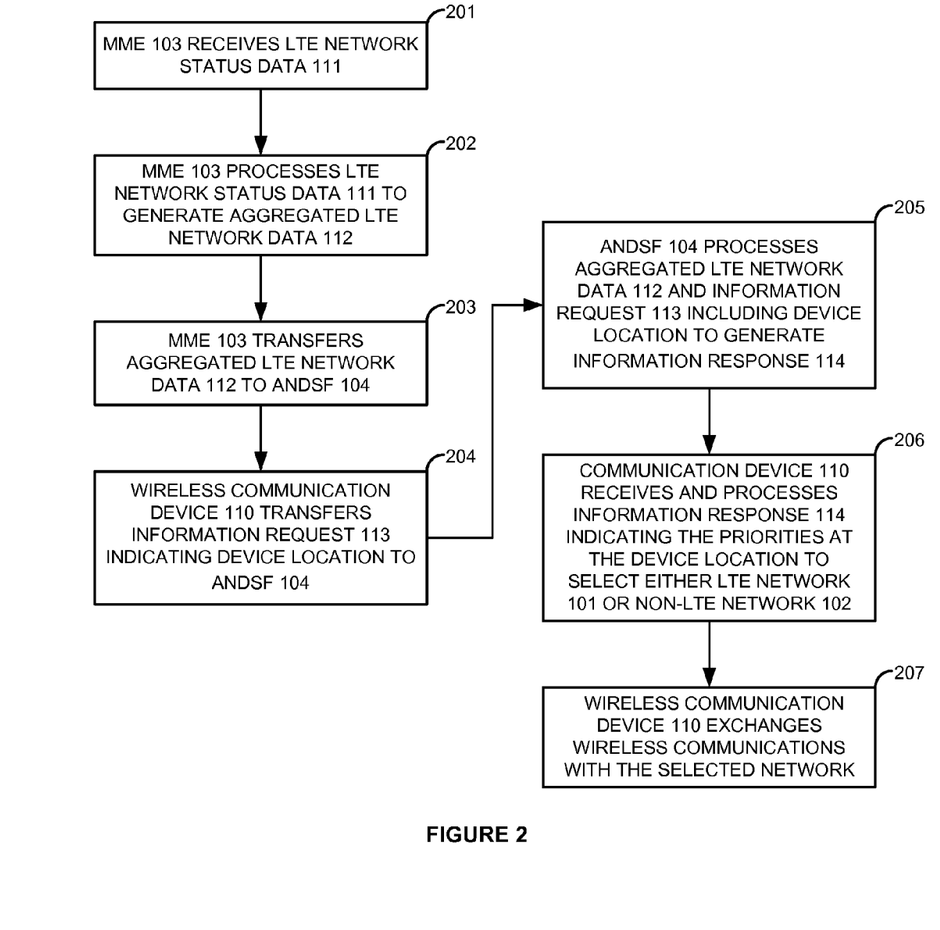
FIG. 2 illustrates the operation of the wireless communication network to support network selection by a wireless communication device.

FIG. 2 illustrates the operation of wireless communication network 100 to support network selection by wireless communication device 110. MME 103 receives LTE network status data 111 (201). LTE network status data 111 may include RF data from eNodeBs, VoLTE service status, video streaming service status, and the like. MME 103 processes LTE network status data 111 to generate aggregated LTE network data 112 (202). MME 103 transfers aggregated LTE network data 112 to ANDSF 104 (203). Aggregated LTE network data 112 may indicate RF status, VoLTE service status, video streaming service status, or some other network status metrics.

Wireless communication device 110 transfers information request 113 indicating device location to ANDSF 104 (204). Information request 113 may include additional information such as, user identifiers, media identifiers, application identifiers, network identifiers, base station identifiers, sector identifiers, RF measurements, or some other data. ANDSF 104 processes aggregated LTE network data 112 and information request 113 including device location to generate information response 114 (205). Information response 114 indicates priorities between LTE network 101 and non-LTE network 102 at the device location. The priorities may include thresholds and associated logic to control network selection based on real-time parameters such as, signal strength, RF noise, network ID, sector ID, communication protocol, user ID, device ID, application ID, and the like. Information response 114 includes contact information for LTE network 101 and non-LTE network 102. The contact information may indicate network ID, sector ID, frequency band, communication protocol, communication channel, media service, modulation and coding schema, MIMO configurations, user ID, access code, or some other network attachment data.

ANDSF 104 transfers the information response 114 to wireless communication device 110. Communication device 110 receives and processes information response 114 indicating the priorities at the device location to select either LTE network 101 or non-LTE network 102 (206). Wireless communication device 110 then exchanges wireless communications with the selected network (207).

Figure 3:
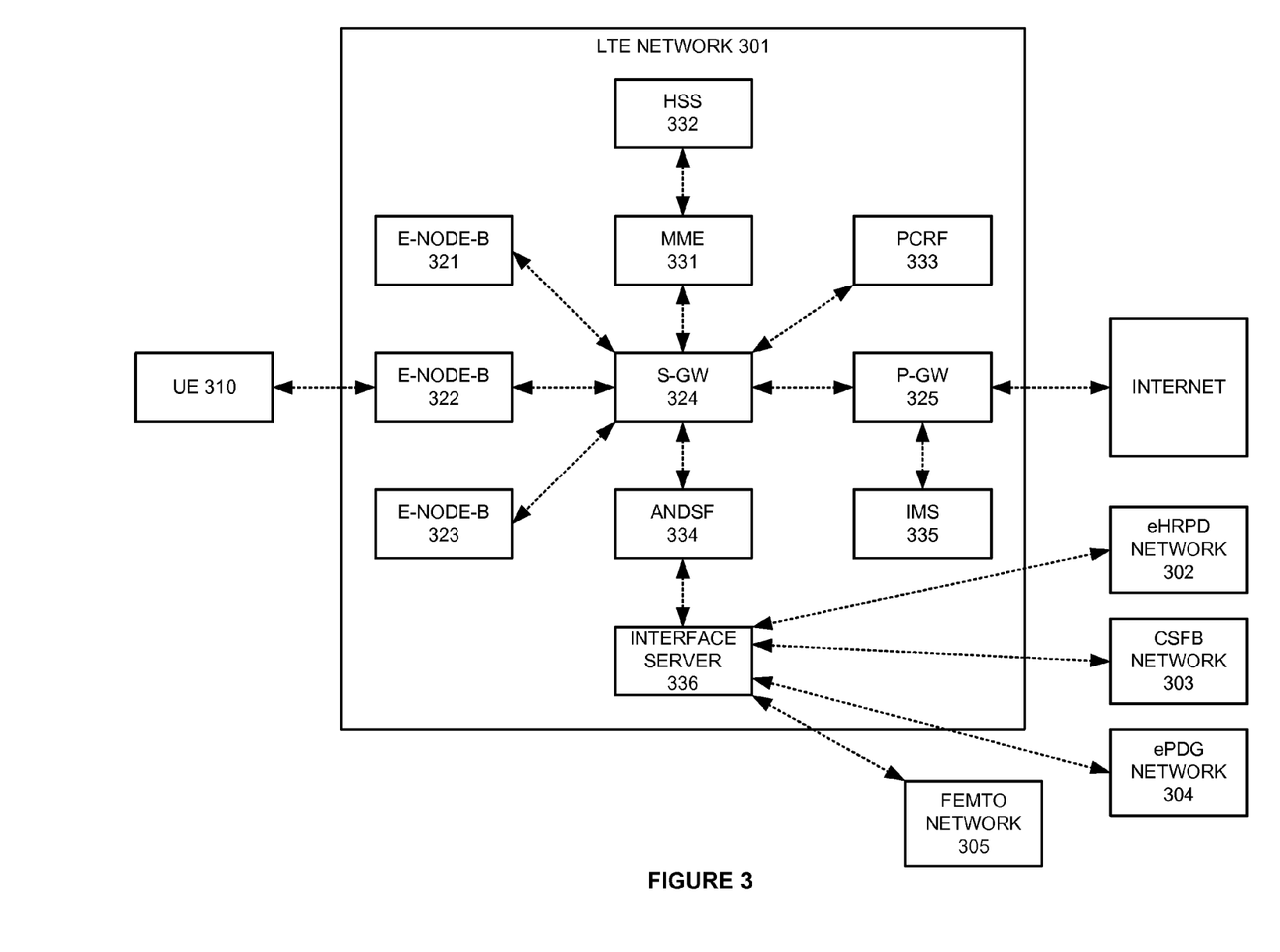
FIG. 3 illustrates an LTE network to support network selection by User Equipment.

FIG. 3 illustrates LTE network 301 to support network selection by User Equipment 310. LTE network 301 comprises: User Equipment (UE) 310, eNodeBs 321-323, Gateways 324-325, MME 331, Home Subscriber Server (HSS) 332, Policy Charging and Rules Function (PCRF) 333, ANDSF 334, IMS 335, and interface server 336. The dotted arrows show typical physical connections among the LTE elements, although these couplings may vary somewhat.

The physical connections transport communication links or "interfaces" between various systems. For instance, there is an interface between UE 310 and MME 331 through eNodeB 322 and S-GW 324. These interfaces are usually standardized but they may use custom links or include non-standard components. Although the interfaces used herein may vary, the following interfaces may be used by LTE network 301 to support network selection by UE 310: UE-eNodeB, UE-MME, UE-ANDSF, UE-PGW, eNodeB-MME, MME-HSS, MME-ANDSF, PCRF-ANDSF, PCRF-MME, PCRF-SGW, PCRF-PGW, and PCRF-IMS. ANDSF 334 has interfaces with UE 310, MME 331, PCRF 333, and interface server 336.

Interface server 336 has interfaces with ANDSF 334, enhanced High Rate Packet Data (eHRPD) network 302, Circuit Switch Fall Back (CSFB) network 303, enhanced Packet Data Gateway (ePDG) network 304, and femto-cell network 305. Interfaces to GSM networks and eHSPA networks could also be shown, but are omitted for clarity. Interface server 336 could distributed across or at least partially integrated within other systems, such as ANDSF 334, PGW 325, SGW 324, MME 331, PCRF 333, or some other systems.

Figure 4:
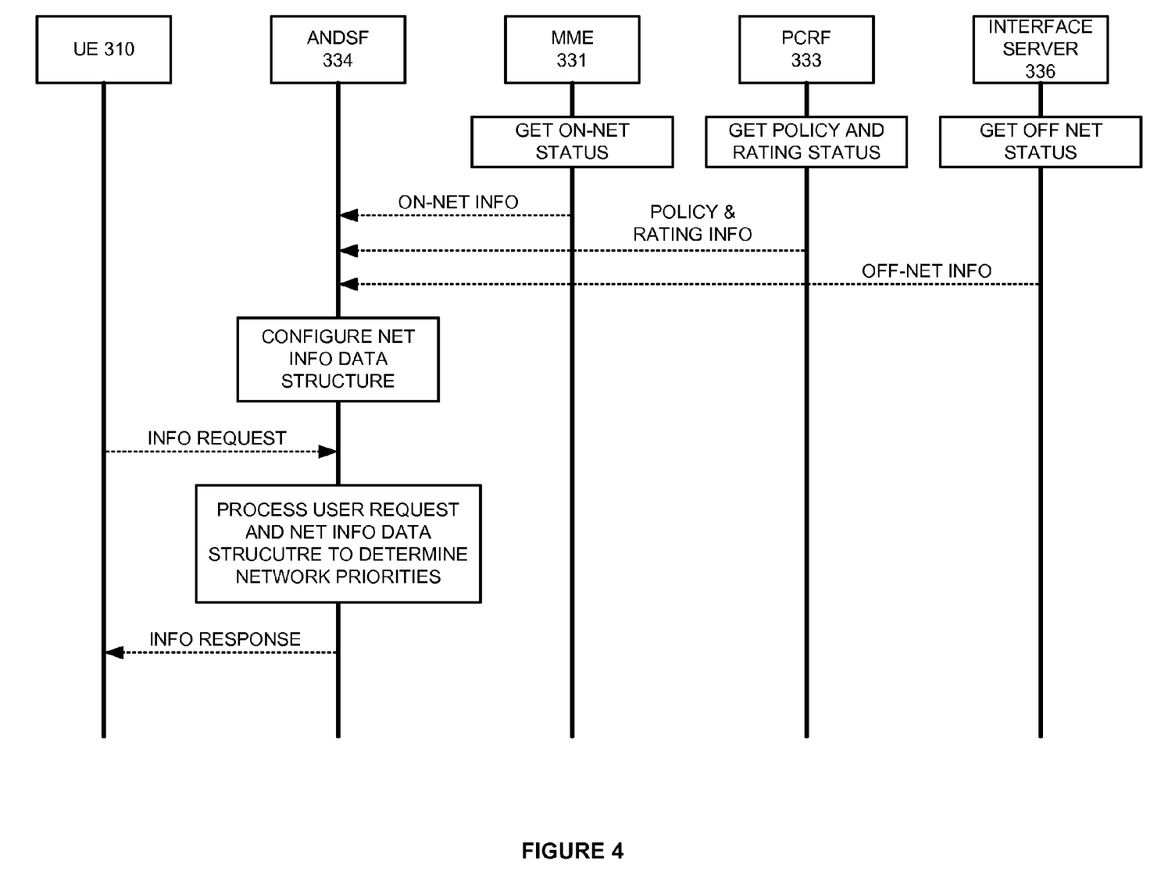
FIG. 4 illustrates the operation of the LTE network to support network selection by the User Equipment.

FIG. 4 illustrates the operation of LTE network 301 to support network selection by User Equipment 310. MME 331 obtains on-net (LTE) status including RF data, service quality data, capacity and loading data, and the like. PCRF 333 obtains policy and rating data for local users. Interface server 336 obtains off-net (non-LTE) status including RF data, service quality data, capacity and loading data, and the like. MME 331, PCRF 333, and interface server 336 transfer network and other data to ANDSF 334.

ANDSF 334 processes these inputs to develop a network information data structure. The data structure associates network status and service information from multiple networks to geographic locations or areas. The data structure may be used to geographically compare similar network data across multiple networks, such as RF signal strength, RF noise, forward and reverse channel bandwidths, base station loading, backhaul loading, and access channel loading. The data structure may be used to geographically compare similar service metrics across multiple networks, such as voice quality, video quality, packet loss, packet latency, and packet jitter. The data structure may be used to geographically compare similar user requirements across multiple networks, such as available services, security ratings, costs, promotions, and the like. The data structure also yields contact information for the networks. The contact information may indicate network ID, sector ID, frequency band, communication protocol, communication channel, media service, modulation and coding schema, MIMO configurations, user ID, access code, or some other network attachment data. The data structure may also yield thresholds and associated logic based on real-time measurements. For example, if a promotional low-cost network option becomes available with the present ability to support high-definition video streaming, then the data structure may yield the logical if/then statement to use the low-cost network at select locations when real-time measures of RF noise on LTE network 301 exceed a threshold.

ANDSF 334 receives an information request from UE 310. The information request indicates device location but may also include device type, application type, user instructions, network and service quality measurements, and the like. ANDSF processes the user request and the data structure to yield an information response. The information response details multi-network selection priorities based on the individual user, location, service, application, and device in light of comparative network status at the RF, backhaul, and service levels.

Figure 5:
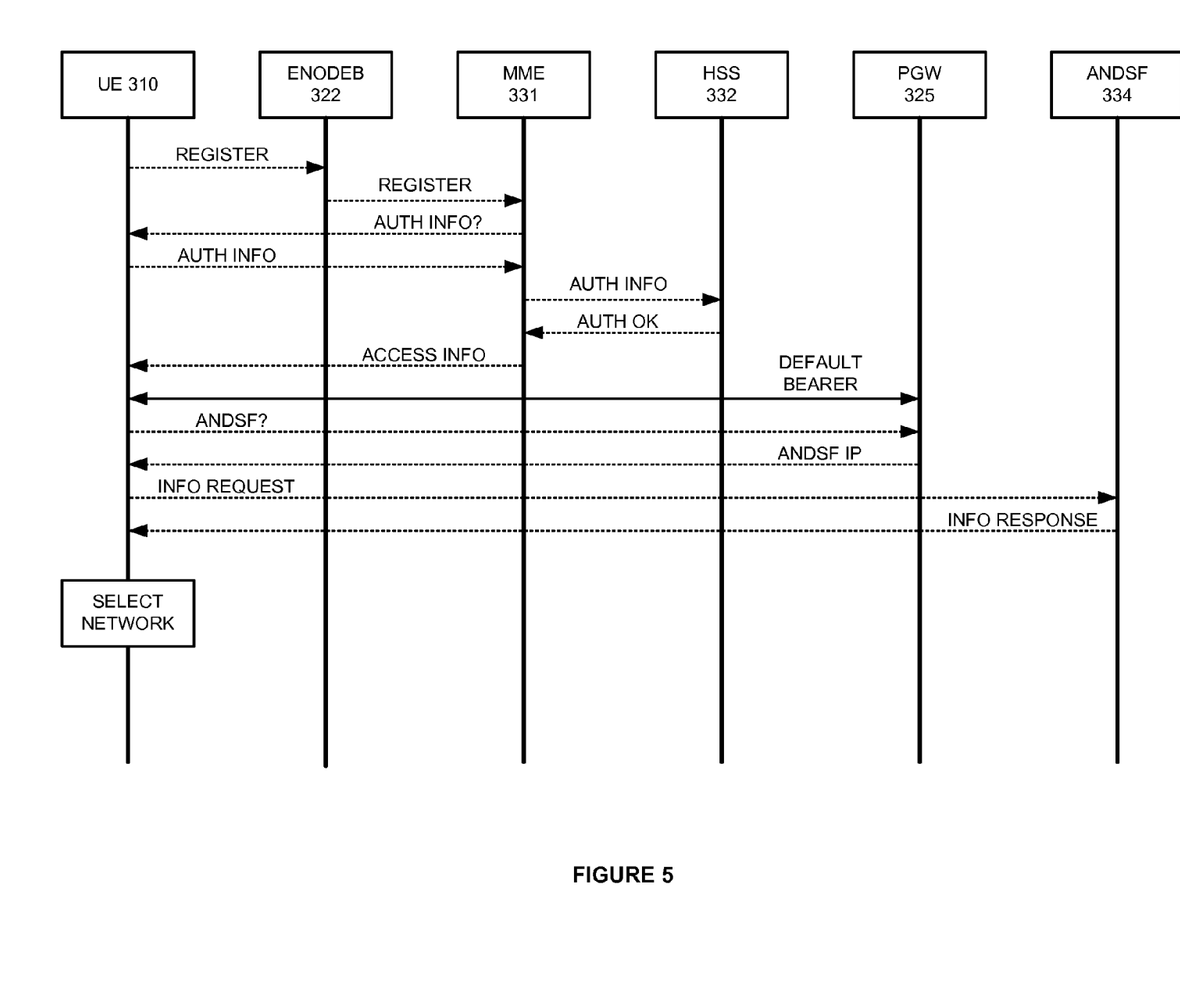
FIG. 5 illustrates the operation of the LTE network to support network selection by the User Equipment.

FIG. 5 illustrates the operation of LTE network 301 to support network selection by User Equipment 310. UE 310 registers with proximate eNodeB 322 upon power-up or cell entry, and eNodeB 322 forwards the registration to the appropriate MME 331. MME 331 exchanges authentication info with UE 310 and then exchanges authorization information with HSS 332. HSS 322 may provide network and user data for inclusion within the data feed to ANDSF 334. Upon successful authentication/authorization, MME 331 transfers access information to UE 310 for a default bearer to PGW 325.

When the default bearer is active, UE 310 requests ANDSF support from PGW 325 which returns contact info, such as IP address, for ANDSF 334. UE 310 then sends an information request to ANDSF 334, and ANDSF 334 returns the information response as discussed above. UE 310 processes the information response to select one or more of the networks for wireless communications.

For example, UE 310 may select a CDMA voice network over a VoLTE network for a voice call based on a few real-time measurements applied to the logic and thresholds from the information response. In another example, UE 310 may select an eHRPD network for an email application over an LTE network and a WiFi network based on instructions in the information response that were generated responsive to LTE backhaul problems and user WiFi security concerns. In another example, UE 310 may select a WiFi network over an LTE network for an internet session based on location and WiFi signal strength—and using the proper SSID and password provided in the information response. In yet another example, UE 310 may select an eHSPA network over an LTE network for an application updates based on comparative signal strength and time of day.

Figure 6:
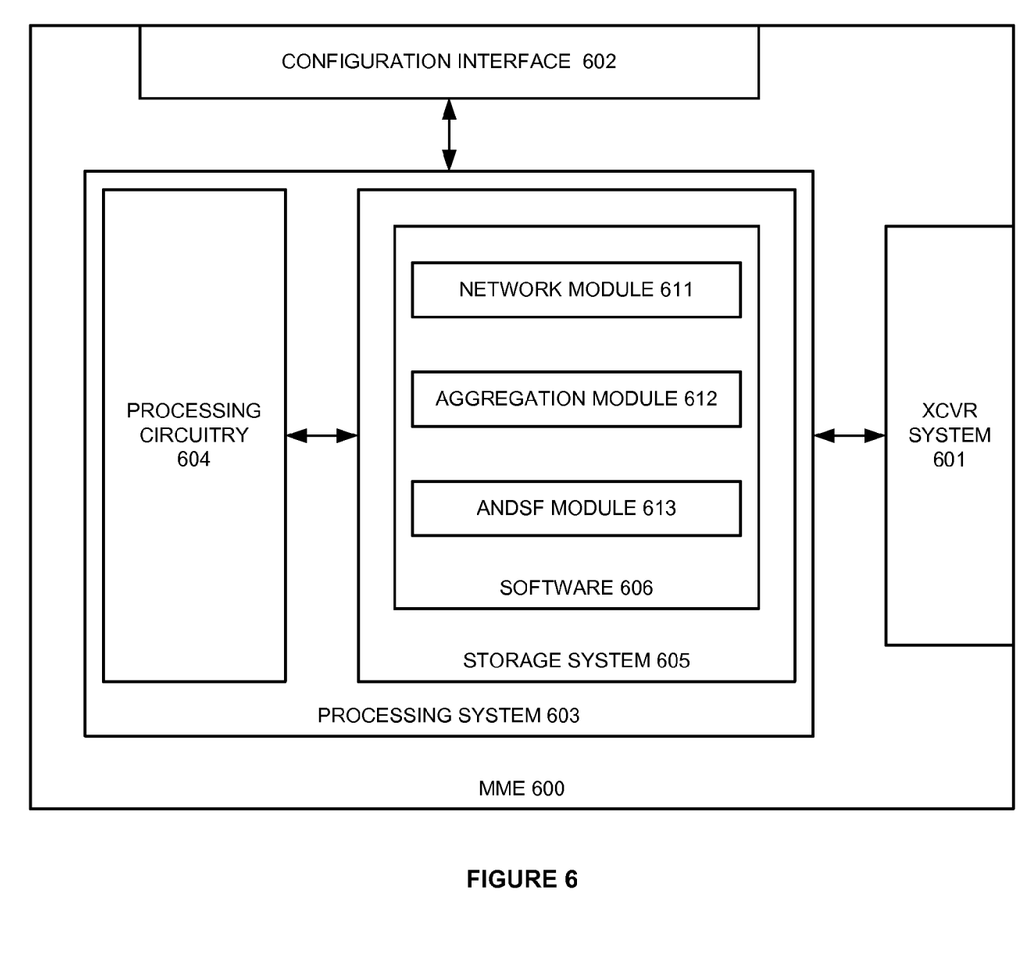
FIG. 6 illustrates an LTE MME to support network selection by the User Equipment.

FIG. 6 illustrates LTE MME 600 to support network selection by User Equipment. MME 600 is an example of MME 103 and MME 331, although these MMEs may use alternative configurations. MME 600 comprises transceiver system 601, configuration interface 602, and processing system 603. Processing system 603 comprises processing circuitry 604 and storage system 605. Storage system 605 stores software 606. MME 600 may be integrated within other systems and may be distributed across multiple diverse computer and communication systems. Some conventional aspects of MME 600 are omitted for clarity, such as power supplies, enclosures, and the like.

Transceiver system 601 comprises communication components, such as ports, circuitry, memory, software, and the like. Transceiver system 601 uses LTE interface protocols or some other communication format. Transceiver system 601 receives LTE network status data and transfers aggregated LTE network data as described herein.

Configuration interface 602 comprises a programming interface to receive data, such as data aggregation instructions.

Processing circuitry 604 comprises circuit boards that hold integrated circuitry and associated electronics. Storage system 605 comprises non-transitory, machine-readable, data storage media, such as flash drives, disc drives, servers, memory circuitry, and the like. Software 606 comprises machine-readable instructions that control the operation of processing circuitry 604 when executed. Software 606 includes modules 611-613 and may also include operating systems, applications, utilities, databases, and the like. All or portions of software 606 may be externally stored on flash drives, discs, servers, and the like.

When executed by processing circuitry 604, network status module 611 directs circuitry 604 to process the LTE network status data from multiple sources as described herein. When executed by processing circuitry 604, data aggregation module 612 directs circuitry 604 to reformat and combine the network status data into aggregated LTE network data as described herein. When executed by processing circuitry 604, ANDSF module 613 directs circuitry 604 to direct the transfer of the aggregated LTE network data to ANDSF systems as described herein.

Figure 7:
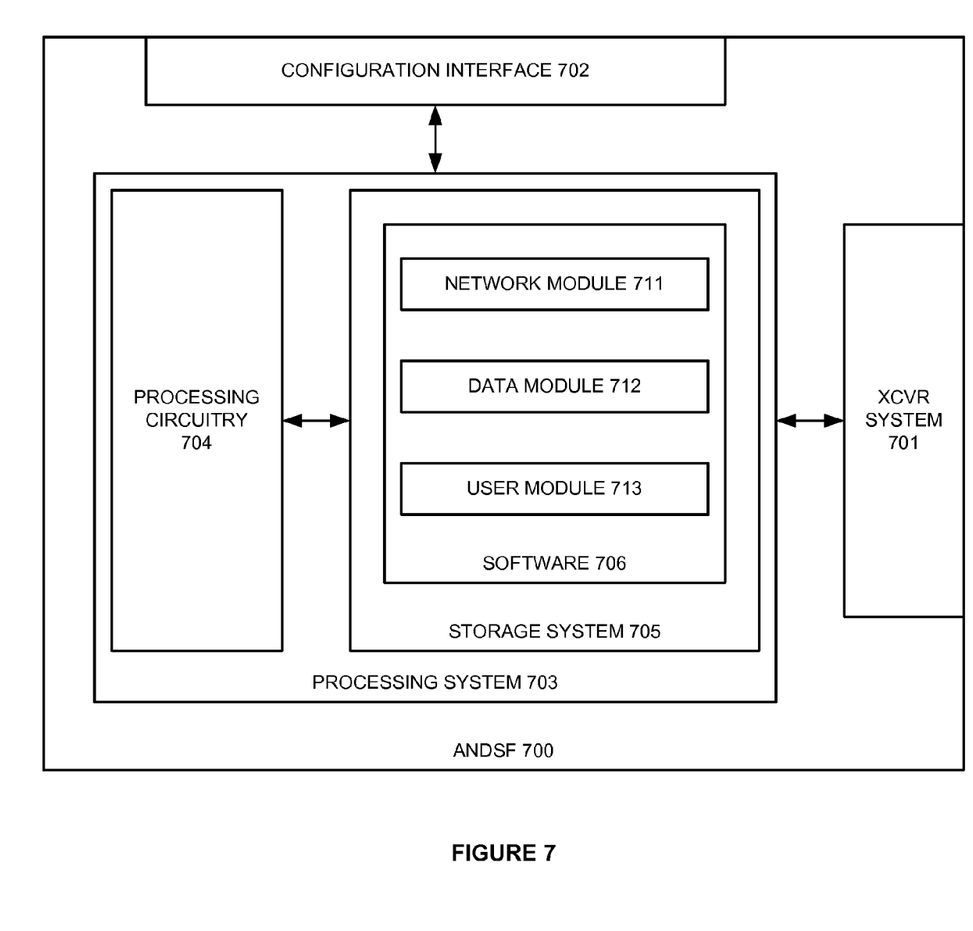
FIG. 7 illustrates an LTE ANDSF to support network selection by the User Equipment.

FIG. 7 illustrates LTE ANDSF 700 to support network selection by User Equipment. LTE ANDSF 700 is an example of ANDSF 104 and ANDSF 304, although these systems may use alternative configurations. ANDSF 700 comprises transceiver system 701, configuration interface 702, and processing system 703. Processing system 703 comprises processing circuitry 704 and storage system 705. Storage system 705 stores software 706. ANDSF 700 may be integrated within other systems and may be distributed across multiple diverse computer and communication systems. Some conventional aspects of ANDSF 700 are omitted for clarity, such as power supplies, enclosures, and the like.

Transceiver system 701 comprises communication components, such as ports, circuitry, memory, software, and the like. Transceiver system 701 typically uses LTE interface protocols to transfer IP, Diameter, and like formats. Transceiver system 701 receives network data and user requests and transfers user responses as described herein.

Configuration system 702 comprises a programming interface to receive data, such as network topologies, logic, and thresholds for network selection.

Processing circuitry 704 comprises circuit boards that hold integrated circuitry and associated electronics. Storage system 705 comprises non-transitory, machine-readable, data storage media, such as flash drives, disc drives, servers, memory circuitry, and the like. Software 706 comprises machine-readable instructions that control the operation of processing circuitry 704 when executed. Software 706 includes modules 711-713 and may also include operating systems, applications, utilities, databases, and the like. All or portions of software 706 may be externally stored on flash drives, discs, servers, and the like.

When executed by processing circuitry 704, network module 711 directs circuitry 704 to process incoming network information as described herein. When executed by processing circuitry 704, data module 712 directs circuitry 704 to develop the geographic-based network selection data structure as described herein. When executed by processing circuitry 704, user module 713 directs circuitry 704 to process user information requests to generate information responses for network selection as described herein.

Figure 8:
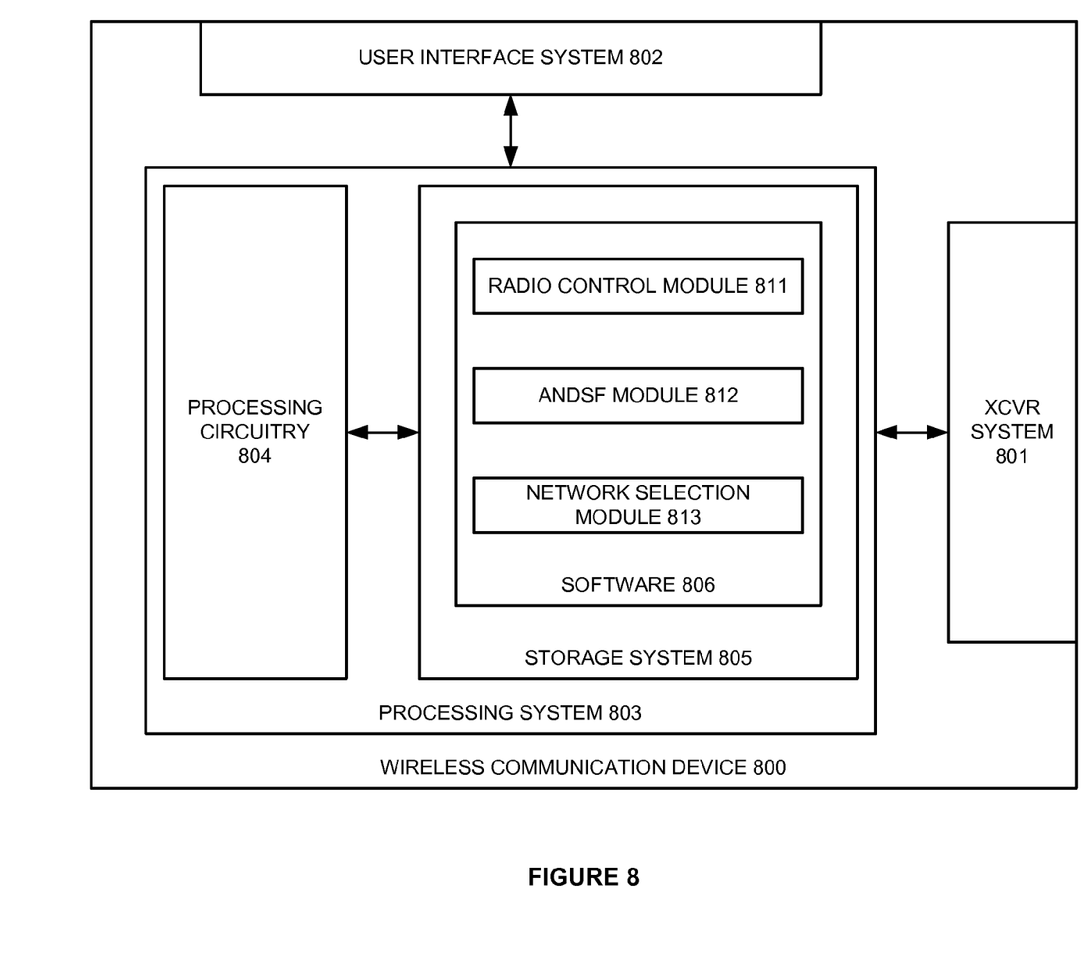
FIG. 8 illustrates a wireless communication device to perform network selection based on information from an LTE ANDSF.

FIG. 8 illustrates wireless communication device 800 to perform network selection based on information from an LTE ANDSF. Wireless communication device 800 is an example of the wireless communication device 110 and UE 310, although these devices may use alternative configurations. Wireless communication device 800 comprises transceiver system 801, user interface system 802, and processing system 803. Processing system 803 comprises processing circuitry 804 and storage system 805. Storage system 805 stores software 806. Wireless communication device 800 may be integrated within other systems and may be distributed across multiple diverse computer and communication systems. Some conventional aspects of wireless communication device 800 are omitted for clarity, such as power supplies, enclosures, and the like.

Transceiver system 801 comprises communication components, such as antennas, ports, filters, amplifiers, circuitry, memory, software, and the like. Transceiver system 801 uses protocols such as LTE, CDMA, GSM, EVDO, HSPA, WIFI, or some other communication format. Transceiver system 801 wirelessly communicates as described herein to obtain network selection data from ANDSFs.

User interface system 802 comprises displays, touchscreens, speakers, microphones, vibrators, switches, buttons, lights, and/or some other human-to-machine interfaces. User interface system 802 may receive data used in network selection such as user instructions, application launches and the like.

Processing circuitry 804 comprises circuit boards that hold integrated circuitry and associated electronics. Storage system 805 comprises non-transitory, machine-readable, data storage media, such as flash drives, disc drives, memory circuitry, and the like. Software 806 comprises machine-readable instructions that control the operation of processing circuitry 804 when executed. Software 806 includes modules 811-813 and may also include operating systems, applications, utilities, databases, and the like. All or portions of software 806 may be externally stored on flash drives, discs, servers, and the like.

When executed by processing circuitry 804, radio control module 811 directs circuitry 804 to access various networks as described herein. When executed by processing circuitry 804, ANDSF module 812 directs circuitry 804 to obtain network selection data from ANDSFs as described herein. When executed by processing circuitry 804, network selection module 813 directs circuitry 804 to process network selection data and real-time measurements to select networks as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) network comprising:
   in a Mobility Management Entity (MME), receiving LTE network status data, wherein the LTE network status data comprises Radio Frequency (RF) status data transferred from a plurality of eNodeBs;
   in the MME, processing the LTE network status data to generate aggregated LTE network data and transferring the aggregated LTE network data for delivery to an Access Network Discovery and Selection Function (ANDSF);
   in the ANDSF, receiving the aggregated LTE network data;
   in the ANDSF, receiving an information request transferred by a wireless communication device, wherein the information request that indicates a user identifier and a device location for the wireless communication device;
   in the ANDSF, processing the user identifier, the device location, and the aggregated LTE network data to generate an information response indicating a priority between the LTE network and a non-LTE network at the device location and transferring the information response for delivery to the wireless communication device.

2. The method of claim 1 wherein:
   in the MME, receiving and processing the LTE network status data to transfer the aggregated LTE network data further comprises receiving and processing Voice over LTE (VoLTE) service data to transfer the aggregated LTE network data that indicates VoLTE service status;
   in the ANDSF, processing the user identifier, the device location and the aggregated LTE network data to generate the information response indicating the priority further comprises processing the VoLTE service status for the device location to generate the priority between the LTE network and the non-LTE network to provide voice calling at the device location.

3. The method of claim 1 wherein:
   in the MME, receiving and processing the LTE network status data to transfer the aggregated LTE network data further comprises receiving and processing video streaming service data to transfer the aggregated LTE network data that indicates video streaming service status;
   in the ANDSF, processing the user identifier, the device location, and the aggregated LTE network data to generate the information response indicating the priority further comprises processing the video streaming service status for the device location to generate the priority between the LTE network and the non-LTE network to provide video streaming at the device location.

4. The method of claim 1 wherein:
in the ANDSF, receiving the information request from the wireless communication device further comprises receiving the information request that indicates a media service;
in the ANDSF, processing the user identifier, the device location, and the aggregated LTE network data to generate the information response indicating the priority further comprises processing the aggregated LTE network data to generate the information response indicating the priority between the LTE network and the non-LTE network to provide the media service at the device location.

5. The method of claim 1 further comprising:
in an interface server, receiving and processing other network status data for the non-LTE network to transfer aggregated non-LTE network data for delivery to the ANDSF; and
in the ANDSF, receiving the aggregated non-LTE network data; and
in the ANDSF, processing the aggregated non-LTE network data to generate the information response indicating the priority between the LTE network and the non-LTE network at the device location.

6. The method of claim 1 wherein the non-LTE network comprises a Code Division Multiple Access (CDMA) network or a Global System for Mobile communications (GSM) network.

7. The method of claim 1 wherein the non-LTE network comprises an enhanced High Rate Packet Data (eHRPD) network or an evolved High Speed Packet Access (eHSPA) network.

8. The method of claim 1 wherein the non-LTE network comprises a Wireless Fidelity (WiFi) network.

9. A Long Term Evolution (LTE) network comprising:
a Mobility Management Entity (MME) configured to receive LTE network status data, wherein the LTE network status data comprises Radio Frequency (RF) status data transferred from a plurality of eNodeBs;
the MME configured to process the LTE network status data to generate aggregated LTE network data, and transfer the aggregated LTE network data for delivery to an Access Network Discovery and Selection Function (ANDSF); and
the ANDSF configured to receive the aggregated LTE network data, receive an information request transferred by a wireless communication device that indicates a user identifier and a device location, process the user identifier, the device location, and the aggregated LTE network data to generate an information response indicating a priority between the LTE network and a non-LTE network at the device location, and to transfer the information response for delivery to the wireless communication device.

10. The LTE network of claim 9 wherein:
the MME is configured to process the LTE network status data further comprising Voice over LTE (VoLTE) service data to transfer the aggregated LTE network data indicating VoLTE service status;
the ANDSF is configured to process the aggregated LTE network data indicating the VoLTE service status for the device location to generate the priority between the LTE network and the non-LTE network to provide voice calling at the device location.

11. The LTE network of claim 9 wherein:
the MME is configured to process the LTE network status data further comprising video streaming service data to transfer the aggregated LTE network data indicating video streaming service status;
the ANDSF is configured to process the aggregated LTE network data indicating the video streaming service status for the device location to generate the priority between the LTE network and the non-LTE network to provide video streaming at the device location.

12. The LTE network of claim 9 wherein:
the information request from the wireless communication device also indicates a media service;
the ANDSF is configured to process the media service indication to generate the information response indicating the priority between the LTE network and the non-LTE network to provide the media service at the device location.

13. The LTE network of claim 9 further comprising:
an interface server configured to receive and process other network status data for the non-LTE network to transfer aggregated non-LTE network data for delivery to the ANDSF; and
the ANDSF is configured to receive and process the aggregated non-LTE network data; and to generate the information response indicating the priority between the LTE network and the non-LTE network at the device location.

14. The LTE network of claim 9 wherein the non-LTE network comprises a Code Division Multiple Access (CDMA) network or a Global System for Mobile communications (GSM) network.

15. The LTE network of claim 9 wherein the non-LTE network comprises an enhanced High Rate Packet Data (eHRPD) network or an evolved High Speed Packet Access (eHSPA) network.

16. The LTE network of claim 9 wherein the non-LTE network comprises a Wireless Fidelity (WiFi) network.

* * * * *